Patented Apr. 19, 1927.

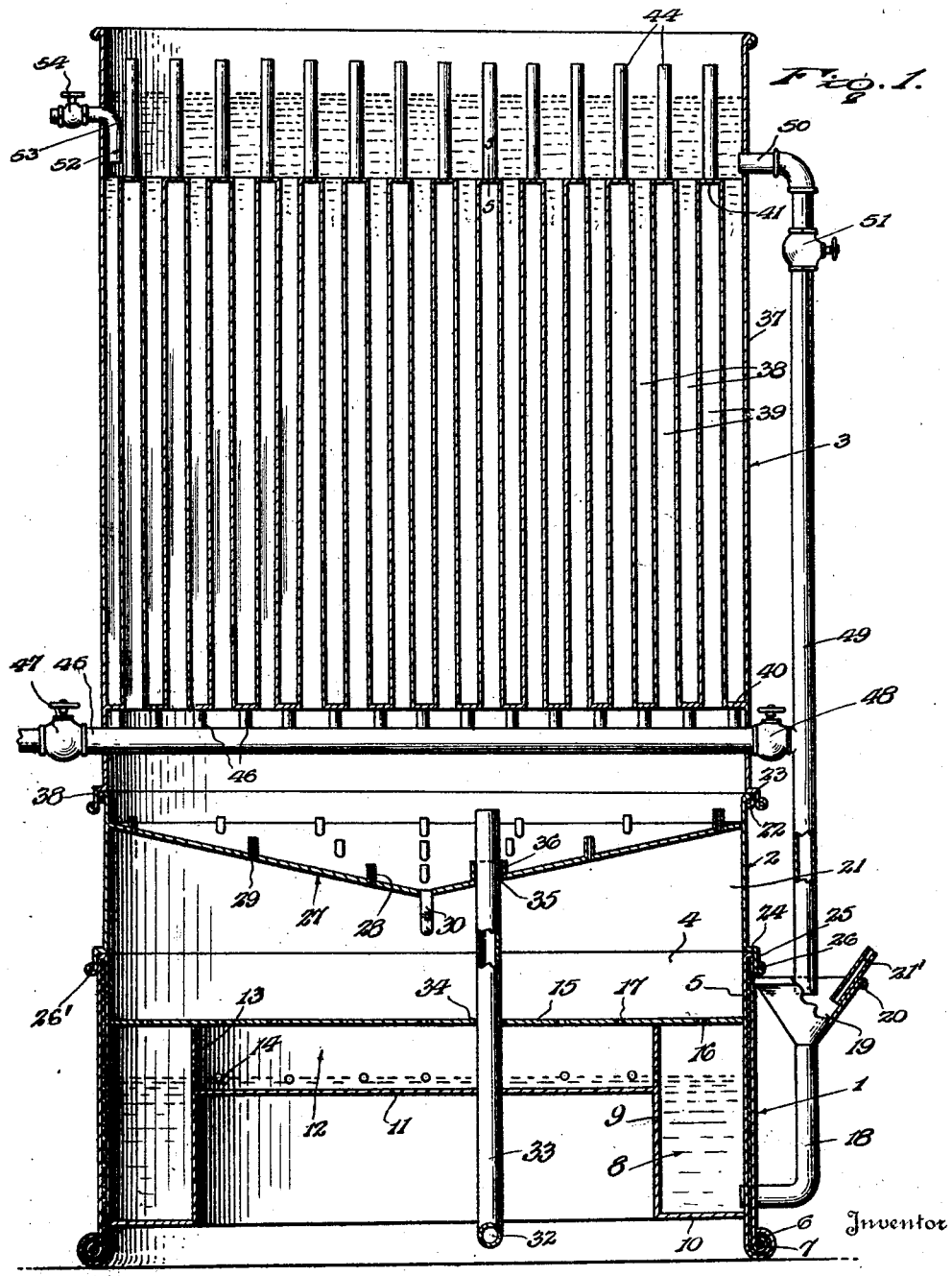

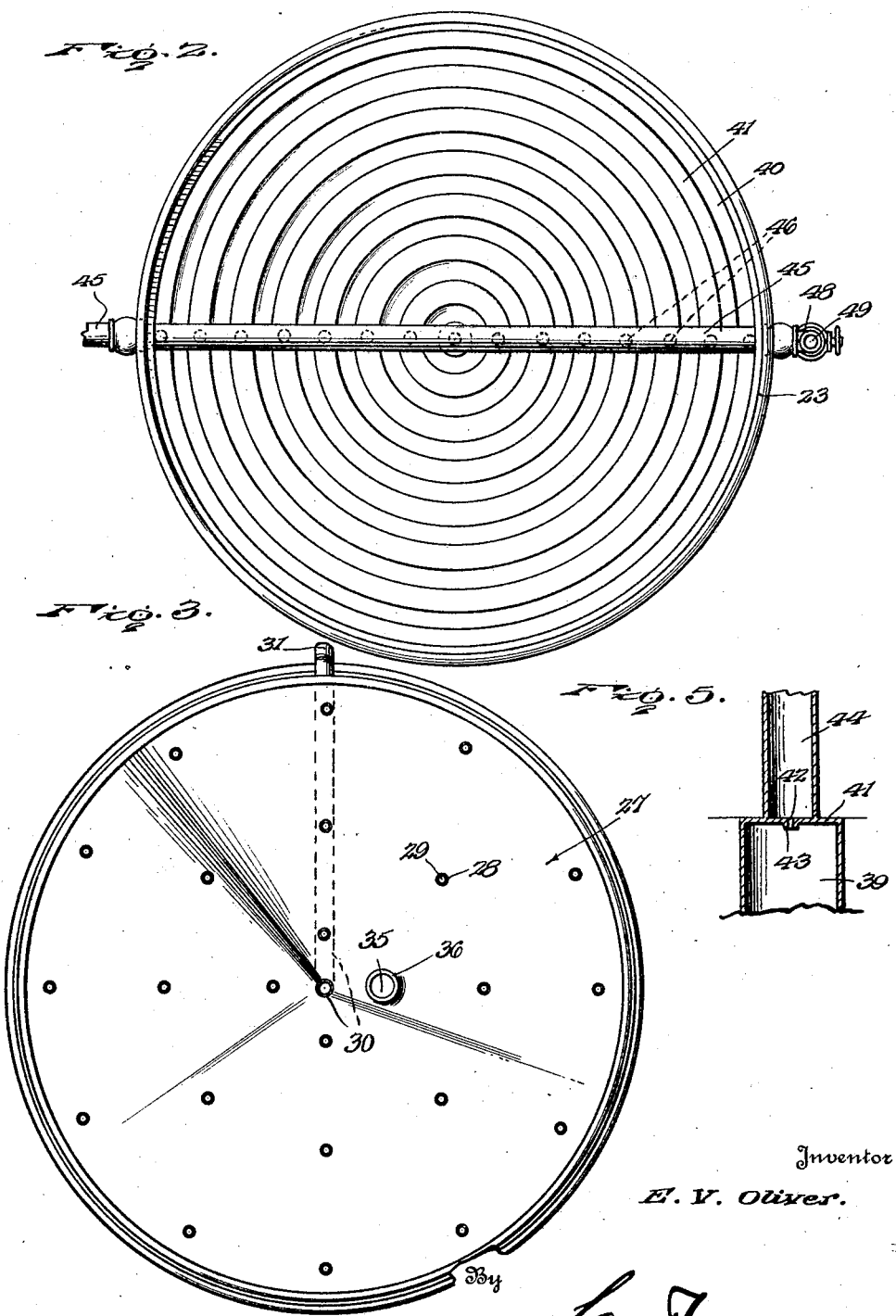

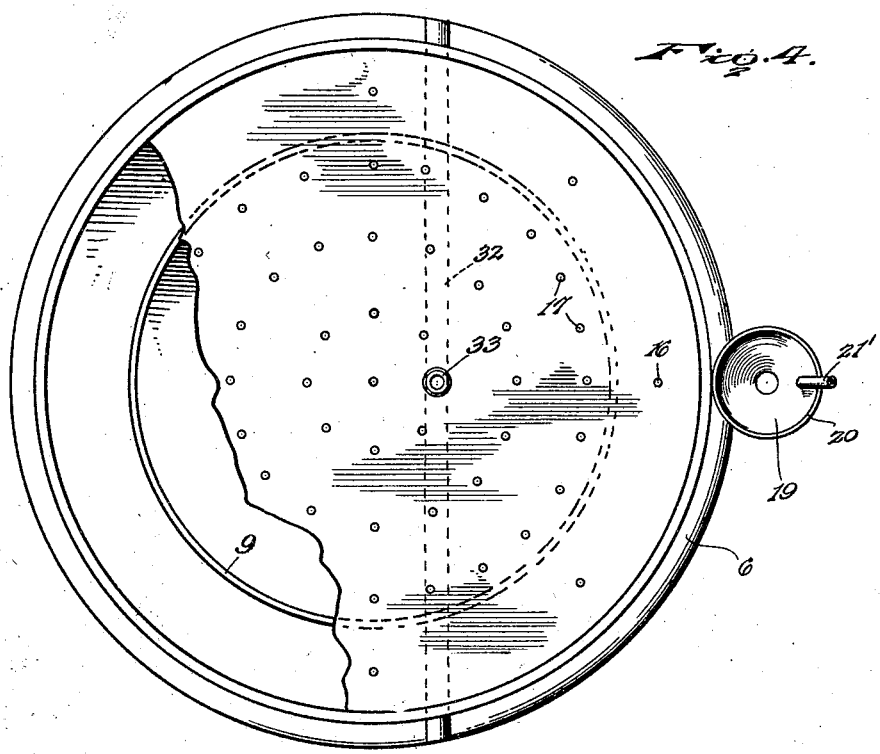
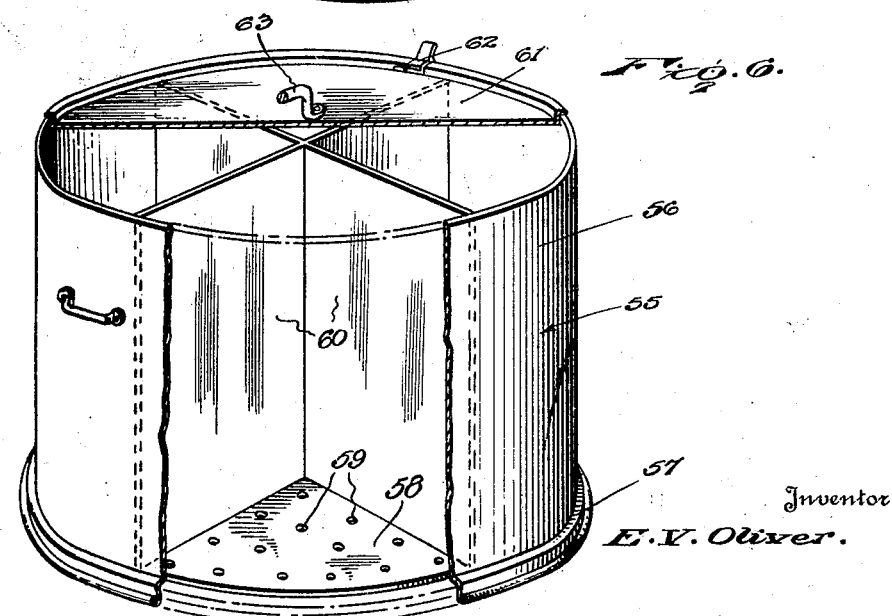

1,625,223

UNITED STATES PATENT OFFICE.

ERNON V. OLIVER, OF PORTLAND, OREGON.

WATER STILL.

Application filed December 4, 1923. Serial No. 678,450.

This invention relates to improvements in water stills and has as one of its objects to provide a still for domestic use which may be operated at a minimum cost and which will embody features of construction rendering it of maximum efficiency in operation.

Another object of the invention is to so construct the still that there will be effected an economy in the consumption of the fuel necessary to carry out the distilling operation.

Another object of the invention is to provide a still so constructed that the steam to be condensed will be generated from an extremely shallow body of water thereby not only economizing in fuel required to convert the water into steam, but also providing for more rapid vaporization of the water.

Another object of the invention is to provide a generating unit so constructed that the water to be vaporized will be preheated in an economical manner thereby effecting a further economy in the consumption of fuel.

Another object of the invention is to provide a still so constructed that in its operation the distilled water will be aerated, means being provided for introducing air into the vapor substantially at the moment of condensation, so that the distilled product will not be "flat" as is usually the case with distilled water, but will, on the other hand, contain substantially the same volume of absorbed air as does ordinary water from natural sources.

Briefly described, the still embodying the invention comprises a generator, a receiver for the distilled water, and means for condensing the water vapor, and the invention contemplates providing means whereby water which is employed as a cooling medium in the condenser may, as its temperature is raised through the exchange of heat units, be delivered to the generator in a more or less preheated state, thereby expediting the conversion of the water into steam.

Another and important object of the invention is to provide a novel construction of condenser, the condenser being so constructed as to present a maximum surface area to the cooling medium and to the vapors to be condensed and yet be compact, thereby especially adapting the still for home use.

Another object of the invention is to provide a novel receiver for the condenser vapors, which receiver will collect the distilled water in the most effective manner and deliver the same continuously from the apparatus.

Another object of the invention is to provide a distilling apparatus embodying a steam cooker attachment which may be readily substituted for one of the units of the still, thereby permitting the apparatus to be employed in cooking commodities.

In the accompanying drawings:

Figure 1 is a diametric sectional view through a distilling apparatus embodying the invention;

Figure 2 is a bottom plan view of the condenser of the apparatus;

Figure 3 is a top plan view of the receiver of the apparatus;

Figure 4 is a top plan view of the generator;

Figure 5 is a detail sectional view taken substantially on the line 5—5 of Figure 1;

Figure 6 is a sectional perspective view of the steam cooker attachment.

Considering the apparatus solely as a water still, the same consists essentially of a generator which is indicated in general by the numeral 1, a receiver which is indicated in general by the numeral 2, and a condenser which is indicated in general by the numeral 3.

The generator 1 comprises a hollow cylindrical body 4, the wall of which is preferably of hollow construction and is filled with asbestos or other heat insulating material as indicated by the numeral 5 so as to conserve the heat units. Preferably the lower edge portion of the wall of the body is outwardly overturned upon itself to provide a rolled bead 6, and a reinforcing wire or rod 7 is preferably enclosed within the bead, thereby rendering the structure rigid and substantial. Located within the body of the generator is a preheating chamber indicated in general by the numeral 8, this chamber being formed by a cylindrical wall 9 which is concentric to the wall 4 of the generator body, and a bottom 10 which extends between the said walls 4 and 9, the preheating chamber being therefore of annular form and extending continuously about the inner side of the wall 4 of the generator body. The wall 9 of the preheating chamber preferably terminates short of the plane occupied by the upper edge of the wall 4, and supported by the wall 9 and surrounded thereby is a plate 11 which constitutes the bottom of a generating chamber 12, the upper portion of the wall 9 constituting the surrounding wall of the said chamber 12 and being indicated by the numeral 13. Openings 14 are provided in the wall 13 of the generating chamber 12 in a circumferential series immediately above and close to the plane of the bottom 11 of the said chamber, and these openings establish communication between the preheating chamber and the generating chamber. At this point it will be evident that by maintaining a water level within the preheating chamber 8, not higher than the openings 14, a very shallow body of water will be maintained within the generating chamber 12. The generator as a whole is, of course, to be disposed above a stove or other source of heat, and due to the very shallow depth of the volume of water which is within the generating chamber, the water will be practically flashed into steam as it is supplied to the said chamber, thereby effecting economy in the use of fuel and greatly facilitating the vaporization of the water. It will also be evident at this point that the water in the preheating chamber 8 will be heated due to the proximity of this chamber to the stove or other source of heat, so that as the water is supplied to the generating chamber 12 through the openings 14, it will reach the said generating chamber at a more or less elevated temperature.

In order to further conserve the heat units and, to an extent, prevent the hot air currents passing into the upper portion of the apparatus, and on the other hand confine them to the generating chamber 12, a plate 15 is disposed within the generator body and is supported upon the upper edge of the wall 13 of the said generating chamber, the periphery of the plate substantially touching the inner surface of the wall of the generator body 4. Inasmuch as the upper edge of the wall 13 is spaced below the plane occupied by the upper edge of the wall 4 of the generator body, the plate 15 will likewise occupy a position below this plane. A relatively small number of perforations 16 are formed in the plate 15 in that portion which overlies or covers the top of the preheating chamber 8, and a considerably greater number of perforations 17 are formed in that portion of the plate 15 which overlies and covers the top of the generating chamber 12. The openings 16 are only sufficient in number to relieve any pressure of steam which might tend to lift the plate from its proper position upon the wall 13, whereas the openings 17 are of sufficient number to permit free escape of steam from the generating chamber 12, it being understood, however, that the portion of the plate which extends over the top of the generating chamber, constitutes a means for confining the heat to the chamber where it will serve its purpose in vaporizing the water.

In order that water may be supplied to the preheating chamber 8 from a source which will presently be more fully described, a pipe 18 is secured at one end through the wall 4 of the generator and extends upwardly beside the wall and terminates at its upper end in a receiving funnel indicated by the numeral 19, the funnel preferably having its rim overturned, as at 20, so as to be suitably reinforced. The funnel has its open upper side located in a plane a short distance above the plane occupied by the plate 15 and below the plane occupied by the upper edge of the wall 4 of the generator body. For a purpose to be presently pointed out, a short length of pipe or tubing 21' is soldered or otherwise secured to the inner side of the wall of the funnel and projects at its upper end above the top of the funnel to provide for the connection of a hose or tube (not shown) leading from a source of water supply.

As will be evident by reference to Figure 1 of the drawings, the receiver 2 is located upon and supported by the generator 1, and the condenser 3 is in turn located upon and supported by the receiver 2. The receiver 2 comprises a cylindrical body 21 preferably of sheet metal and the upper edge of the wall of the body is overturned, as at 22, so as to be reinforced, it being preferable that a reinforcing wire 23 be located in the bead formed by overturning the said edge of the wall. The body 21 of the receiver is of substantially the same diameter as the body 4 of the generator, and the lower margin of the wall of the receiver body is turned outwardly, as at 24, and thence downwardly, as at 25, and formed with a bead 26 in which is housed a reinforcing rod or wire 26'. This offset portion of the receiver body fits about and rests upon the upper portion of the wall of the generator body, as clearly shown in the said Figure 1, it being understood that the receiver body may be lifted from the generator body when occasion requires. Within the receiver body there is arranged a receiving pan indicated in general by the numeral 27, and this pan is preferably formed from a circular sheet of metal pressed into inverted conical form so that the center of the pan is the lowest point in the area thereof. In order that steam delivered from the generator may pass the receiver and reach the condenser and there be condensed, a plurality of short spouts 28 are arranged in upstanding position upon the upper side of the pan 27 and communicate at their lower ends with openings 29 formed in the said pan, the steam from the generator being delivered through the openings and spouts into the space above the receiving pan. A delivery pipe 30 leads from the center of the pan laterally and through the wall of the body 21 of the receiver and preferably has its discharge end turned downwardly at an angle, as indicated by the numeral 31, so that the pipe will be adapted to discharge either directly into a vessel placed below the said end, or a hose may be connected to this end of the pipe and may lead to any suitable receiving vessel.

As heretofore stated, means is provided for aerating the vapors at the time of condensation thereof, and this means comprises a pipe 32 which is disposed to extend approximately diametrically across the interior of the generator body 1 and has its ends opening through the wall of the said body so that air may enter the pipe from both ends. A branch pipe 33 leads upwardly from the intermediate portion of the pipe 32 and through the bottom 11 of the generating chamber 12, the pipe being welded or otherwise united in a water-tight manner to the said generator body, as shown in Figure 1. The pipe 33 continues upwardly and fits loosely through an opening 34 formed in the plate 15, and further continues upwardly and through an opening 35 formed in the bottom of the pan 27 at one side of the center thereof, a sleeve 36 being secured upon the upper side of the pan and surrounding the said opening 35 and the portion of the pipe which extends therethrough and constituting means for preventing the escape of distilled water through the said opening 35. It will be observed that the upper end of the branch pipe 33 terminates a short distance above the bottom of the pan 27 and therefore air taken in through the pipe 32 will be discharged into the space above the said pan. At this point it will be evident that in this manner heated and sterilized air is supplied to the vapors delivered into the space above the receiving pan and mixes with the vapors at the time they are condensed or substantially at such time, so that the distilled water which is delivered from the receiving pan will contain approximately the same volume of absorbed air as water obtained from natural sources.

The condenser 3 comprises a casing 37 which is of cylindrical form and which has the lower edge of its wall outwardly offset, as at 38, so as to adapt the lower end of the casing to be removably fitted onto the upper end of the body of the receiver 2. The casing of the condenser is open at its top and bottom, and arranged within the casing are a plurality of alternately arranged concentric cooling-water chambers 38 and condensation chambers 39. These chambers are of general annular form and are relatively narrow and, as stated, are concentrically arranged with relation to each other and are likewise concentric to the wall of the casing 37, the outer side of the outermost condensation chamber being spaced from the said wall of the casing 37 so that the relatively adjacent walls of the casing and said condensation chamber form the outermost one of the cooling-water chambers. The cooling-water chambers are open at their tops and are provided with closed bottoms indicated by the numeral 40, and the condensation chambers are open at their bottoms and provided with closed tops 41. It will be observed that relatively adjacent ones of the cooling-water and condensation chambers have walls in common so that each condensation chamber is surrounded by a cooling-water chamber. In other words, each condensation chamber is surrounded on all sides except its bottom, by the cooling water which is supplied to the condenser. The open tops of the cooling-water chambers and the closed tops of the condensation chambers are located in a common plane spaced somewhat below the plane of the open top of the casing of the condenser, and likewise the open bottoms of the condensation chambers and the closed bottoms of the cooling-water chambers are suitably spaced above the plane of the bottom of the said casing of the condenser. In order that there may be circulation of the air within the condensation chambers without any appreciable loss of the steam vapors however, the closed top 41 of each condensation chamber is formed with a small vent opening 42, and the material of the said closed top, is turned downwardly, as indicated by the numeral 43, so as to provide a short nipple. The purpose of providing for circulation of air in the manner outlined is to secure a thorough aeration of the steam vapors and to convey from the still any noxious vapors present in the steam in the event the water from which the steam is generated contains any minerals or impurities such, for example, as sulphur, magnesia, etc. A tube 44 is secured upon the closed top of each condensation chamber at diametrically opposite points with relation to the axis of the chamber, and each tube is concentric to the respective one of the vent openings 42 and the tube extends upwardly within the space above the series of chambers nearly to the plane of the open top of the casing of the condenser, the tubes being open at their upper ends.

In order that water may be supplied to the cooling-water chambers of the condenser, a water supply pipe 45 is led through the wall of the casing 37 of the condenser at a point below the plane of the closed bottoms of the cooling-water chambers 38, and this pipe extends diametrically across the interior of the bottom of the casing 37 and has short branches 46 which extend upwardly and communicate with the water chambers through the closed bottoms thereof. A cut-off valve 47 is interposed in the water supply pipe 45 and may be adjusted to regulate the flow of water from the source of supply to the branches 46 and consequently to the cooling-water chambers 38. The other end of the pipe 45 leads through the wall of the casing 37 at the opposite side of said wall and is placed in communication, by a valve 48, with a pipe 49 which extends vertically beside the condenser casing, the lower end of the pipe being positioned to discharge through the funnel 19 of the supply pipe 18, and the upper end of said pipe being placed in communication, by a branch 50, with the interior of the condenser casing 37 at a point above the upper end of the cooling-water and condensation chambers 38 and 39. A cut-off valve 51 is interposed in the length of the pipe 49 between the branch 50 and the valve 48. An overflow pipe 52 is mounted through the wall of the casing 37 at the upper side thereof and is provided interiorly of the casing with a downwardly extending branch 53 to obviate air being drawn through the pipe during the outflow of water therethrough and which would result in the overflow being attended by a gurgling sound. A cut-off valve 54 is mounted in the pipe 52 exteriorly of the condenser casing.

From the foregoing description of the invention, it will be understood that water is admitted to the condenser through the pipe 45 and the branches 46 thereof and into the cooling-water chambers 38, the valve 48 being closed. The water will rise in the water-cooling chambers until it reaches the level of the intake end of the overflow pipe 49. The valve 51 being opened to the proper extent, water will flow downwardly through the pipe 49 and to the funnel 19 and from the funnel through the pipe 18 into the preheated chamber 8 where it will be initially heated and, the flow of water being properly regulated, will be discharged from this chamber through the openings 14 and onto the bottom of the generating chamber 12 where, owing to the small volume of water distributed over the relatively large area of the said bottom of the generating chamber, the water will be rapidly converted into steam. The steam will escape through the openings 17 and will rise and pass through the tubular spouts 28 of the receiving pan 27. Rising above the pan, the steam will enter the condensation chambers 39 and, coming in contact with the water-cooled walls of these chambers, will be condensed, the condensate being delivered to the receiving pan 27 and flowing to the lowest point of the bottom of the pan, will be discharged through the pipe 30. By providing the vent openings 42 in the top of the condensation chambers, a more thorough circulation of the air and steam in these chambers is effected, and there is no appreciable loss of the steam for the reason that if any should escape through the vent openings, it will be condensed in the tubes 44 inasmuch as these tubes are surrounded by the cooling water within the top of the casing of the condenser, and will be returned to the said chambers 39 through the said vent openings, the overturning of the material of the top of the condensation chambers about the opening 42, serving to collect the water and insure of its discharge through the openings and into the said chambers.

In the event that it should for any reason become necessary to empty the condenser of water previously delivered thereto, as, for example, when flowing water is not available and water must be poured into the condenser, this may be accomplished by closing the valves 47, 51 and 54, and then adjusting the valve 48 to permit escape of water therethrough from the cooling-water chambers of the condenser to the funnel 19 and thence to the generator 1 in quantity sufficient to maintain the generator properly supplied with water. It will, of course, be necessary under these conditions to replenish the condenser with water from time to time.

As the apparatus is intended for domestic use, it will preferably embody a steam cooker such as illustrated in Figure 6 of the drawings and indicated in general by the numeral 55. The cooker attachment comprises a cylindrical body 56 having an offset rim 57 at the bottom of its wall adapting it to be fitted onto the top of the receiver 2 after removal of the condenser 3 therefrom. The body of the cooker is provided with a bottom 58 which is formed with perforations 59, and intersecting partitions 60 are arranged within the interior of the cooker body and serve to divide the interior into a number of separate and independent compartments in which may be placed the commodities to be cooked. The body of the cooker is provided with a lid 61 adapted to be held in place by clamps 62 and provided with a handle 63 which may be grasped for the purpose of removing it. When using the apparatus as a steam cooker, a hose, which leads from a suitable source of water supply, is connected to the pipes 21' and water is thus supplied to the generator as needed.

Having thus described the invention, what is claimed as new is:

1. In distilling apparatus, a condenser comprising alternately arranged concentric annular condensation and cooling-fluid chambers, the former being open at their bottoms, and the latter open at their tops, means for supplying the vapors to be condensed to the space below the open bottoms of the condensation chambers, a cooling-fluid supply pipe extending diametrically beneath the assemblage of chambers, branches leading from the pipe to the bottoms of the said cooling-fluid chambers at diametrically opposite points upon the bottom of each chamber, and means for collecting the condensate from the condensation chambers.

2. In distilling apparatus, a condenser comprising alternately arranged concentric annular condensation and cooling-fluid chambers, the condensation chambers being open at their bottoms and having vent openings in their closed tops, tubes leading upwardly from the closed tops of the said condensation chambers and communicating at their lower ends with the said vent openings, the vent openings in the closed top of each condensation chamber being located at diametrically opposite points, a casing enclosing the said condensation and cooling-fluid chambers whereby a body of cooling fluid may be established about the said tubes, a cooling-fluid supply pipe leading diametrically across the casing beneath the assemblage of chambers, branches leading therefrom to the closed bottoms of the cooling-fluid chambers at diametrically opposite points upon the bottom of each chamber, means for supplying the vapors to be condensed through the space below the open bottoms of the condensation chambers, and means for collecting the condensate from the condensation chambers.

In testimony whereof I affix my signature.

ERNON V. OLIVER. [L. S.]